United States Patent [19]
Low et al.

[11] Patent Number: 5,420,926
[45] Date of Patent: May 30, 1995

[54] ANONYMOUS CREDIT CARD TRANSACTIONS

[75] Inventors: Steven H. Low, Bridgewater; Nicholas F. Maxemchuk, Mountainside; Sanjoy Paul, Atlantic Highlands, all of N.J.

[73] Assignee: AT&T Corp., Murray Hill, N.J.

[21] Appl. No.: 177,836

[22] Filed: Jan. 5, 1994

[51] Int. Cl.⁶ .............................................. H04K 1/00
[52] U.S. Cl. ...................................... 380/24; 380/23; 380/25; 380/49
[58] Field of Search ................. 380/23, 24, 25, 30, 380/48, 49, 50

[56] References Cited

U.S. PATENT DOCUMENTS

| | | |
|---|---|---|
| 4,949,380 | 8/1990 | Chaum .................................. 380/30 |
| 4,996,711 | 2/1991 | Chaum .................................. 380/30 |
| 5,224,162 | 6/1993 | Okamoto et al. ..................... 380/24 |

OTHER PUBLICATIONS

"Smart Credit Cards", Weinstein, Stephen; Feb. 1984; IEEE Spectrum pp. 43–49 380/24.
"Transaction Completion Code Based on Digital Signatures"; IBM Technical Disclosure Bulletin vol. 28 No. 3 Aug. 85.

*Primary Examiner*—Tod R. Swann
*Attorney, Agent, or Firm*—Gordon E. Nelson

[57] ABSTRACT

Techniques for performing credit-card transactions without disclosing the subject matter of the transaction to the institution providing the credit card. The techniques include the use of a communications exchange so that information and funds may be transferred without the destination for the transfer knowing the source of the information or funds and the use of public key encryption so that each party to the transaction and the communications exchange can read only the information the party or the exchange needs for its role in the transaction. Also disclosed are techniques for authenticating a card holder by receiving personal information from the card holder, using the information to ask the card holder one or more questions, and using the answers to authenticate the card holder.

19 Claims, 3 Drawing Sheets

FIG. 1

PUBLIC KEY CRYPTOGRAPHY

1. Secret key $S_A$ :msg ---> $S_A$ (msg)  — 101
   - known only to owner

Public key $P_A$ :msg ---> $P_A$ (msg)  — 103
   - known to everyone $$S_A(P_A(msg)) = msg = P_A(S_A(msg))$$

2. Secret communication to A:
   send ---> $P_A$ (msg)

3. Signature by A:
   $Sgn_A(msg) = [msg, S_A(msg)]$

FIG. 3

| Notation | Definition | Explanation |
|---|---|---|
| $F(msg, dst)$ | $E_{cx}(msg, dst)$  <br> 303 | Message $msg$ to be forwarded to destination $dst$ by $cx$, encrypted with $cx$'s public key. $dst$ may be encrypted as $D^e(B_x, X)$ defined below. |
| $F_{src}(msg, dst)$ | $E_{cx}[src, Sgn_{src}(msg, t(src, dst)), dst]$ <br> 305 | Message $msg$ timed-stamped and signed by source $src$ to be forwarded to $dst$ by $cx$, encrypted with $cx$'s public key. The time-stamp $t(src, dst)$ increases for each successive message between $src$ and $dst$ and prevents replay attacks. |
| $X(msg, dst)$ | $E_{dst}(msg)$   307 | Message $msg$ sent by $cx$ to $dst$, encrypted with $dst$'s public key. |
| $X_{src}(msg, dst)$ | $E_{dst}[src, Sgn_{src}(msg, t(src, dst))]$ <br> 309 | Message $msg$ time-stamped and signed by source $src$ sent by $cx$ to $dst$, encrypted with $dst$'s public key. |
| $D^e(B_x, X)$ | $E_{cx}(B_x, E_{B_x}(X))$ <br> 311 | Encrypted destination for account $(B_x, X)$, $X = C$, $P$ or $S$. By sending $D^e(B_x, X)$ to $cx$, a source can send a message to the account without knowing $B_x$ or $X$. $cx$ decrypts $D^e(B_x, X)$ to determine $B_x$, and forwards the message to $B_x$ without knowing $X$. $B_x$ decrypts $E_{B_x}(X)$ to determine account owner $X$. |

505: $F[X_C([S, PIN, D^e(B_{SI}S), E_{CX}(S), E_C(RECORD)], B_C), B_C]$

507: $X_C([S, PIN, D^e(B_{SI}S), E_{CX}(S), E_C(RECORD)], B_C)$

509: $F_{B_C}[(1-\alpha)\delta, D^e(B_{SI}S)]$

511: $X_{CX}[((1-\alpha)\delta, E_{BS}(S) B_S]$

5,420,926

ANONYMOUS CREDIT CARD TRANSACTIONS

BACKGROUND OF THE INVENTION

1. Field of the Invention

The invention concerns information security generally and is more specifically concerned with transactions in which a third party approves the transaction.

2. Description of the Prior Art

As computing and data storage become less expensive, it becomes easier to assemble the information which an individual reveals about himself when he enters into transactions and to use the assembled information in ways which invade the individual's privacy. It is particularly easy to assemble such information when the transactions involve a third party. For example, a credit card company or bank can use the information it acquires in the course of credit- or bank card transactions made by a customer to determine the spending habits of a customer and can then either use that information in its own business or make it available to others. The consequences of the availability of information about an individual's spending habits range from the annoying to the serious. At a minimum, the individual receives more targeted junk mail than he or she otherwise might; more seriously, the same information that is used to target the individual for junk mail can be used to target the individual for private or governmental harassment. Thus, at some point, the ability to collect information about an individual reduces the individual's willingness to deviate from the norm and thus has a chilling effect on his exercise of his rights.

One way an individual can avoid this problem is to pay for everything in cash, since nothing on a bank note indicates who its owner is or was. This same property, however, makes cash both easy to lose and a tempting target for criminals. For both these reasons, few people desire to carry a large amount of cash. One way of solving this difficulty is to use electronic cash, as described in David Chaum, "Security without Identification: Transaction Systems to make Big Brother Obsolete", *Communications of the ACM*, vol. 28, no. 10, pp. 1030-144, October, 1985. When electronic cash is used in an automated transaction, a purchase cannot be associated with a customer. The scheme, however, may be insecure against fraud; see Steven H. Low, et al., "Collusion in a Multi-Party Communications Protocol for Anonymous Credit Cards," submitted to *IEEE/ACM Transactions on Networking*. In addition, since the electronic cash is given to a customer, a means is needed to prevent the individual from duplicating and spending it over and over again.

Protocols are also known for performing payment transactions between mutually distrustful parties over an insecure network. See Semyon Dukach, "SNPP: A Simple Network Payment Protocol", in *Proceedings of the Computer Security Applications Conference*, San Antonio, Tex., November, 1992. However, these protocols do not prevent parties involved in a transaction from compiling information about purchase habits.

What is needed is a way of performing transactions which has the convenience and safety of credit card transactions and the anonymity of cash transactions. It is an object of the invention to provide such a technique, and thereby to overcome major disadvantages of present-day credit card and cash transactions.

SUMMARY OF THE INVENTION

Anonymity is achieved in the credit card transactions of the invention by encrypting the messages required for the transaction such that the involved parties can read only the information required for their parts in the transaction and by sending the messages by means of a communications exchange, so that a party receiving a message does not know the source of the message. For example, only the communications exchange can read the destinations of the messages, while the only information the credit-giving bank can read is the identity of the customer and the amount of the purchase. The protocols used in the credit card transactions of the invention further ensure that the anonymity is maintained even if parties other than the purchaser collude with each other to obtain information about the customer. The principles of the invention are further not limited to credit card transactions, but may be employed in any situation where a party to a transaction wishes to restrict another party from getting more than the minimum amount of information required for the party to participate in the transaction.

Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 5 is a diagram of a simplified preferred embodiment of the invention. Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description begins with a discussion of the cryptographic techniques employed in the invention, continues with an overview of the invention, then gives a detailed description of the protocol used in a preferred embodiment, and concludes with a discussion of collusion and with a description of a simplified implementation of the protocol.

Figure 1:
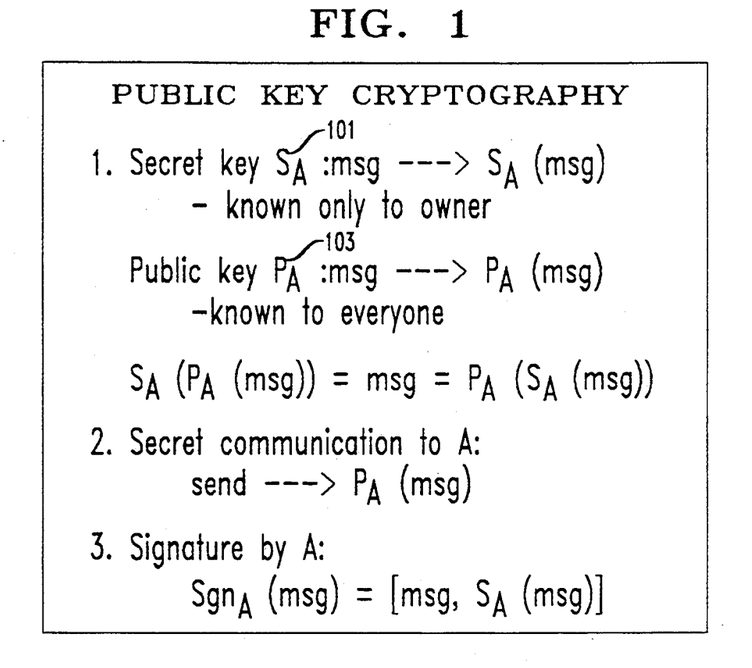
FIG. 1 is a summary of the public key cryptography techniques employed in the invention.

Cryptographic Techniques: FIG. 1

Our protocol makes essential use of two well-known public-key cryptographic tools, public-key encryption $E_A(msg)$ and signature $Sgn_A(msg)$. As shown in FIG. 1, in a system using the tools, each party A that wishes to communicate has a key pair. One of the pair, called the public key 103, is made public, and the other, called the secret key 101, is known only to A. To ensure secrecy of communication one sends $E_A(msg)$ to A, which is the message msg encrypted with A's public key 103 so that only A can decrypt it (with its secret key). To sign a message msg A generates $Sgn_A(msg)$, which is a copy of msg followed by the encryption of msg with A's secret key 101, so that everyone with A's public key 103 can verify the signature but only A could have produced it. Each party in our system has a public key 103 and a secret key 101; the public key 103 is known to all of the other parties, but the secret key 101 is known only to its owner.

Figure 2:
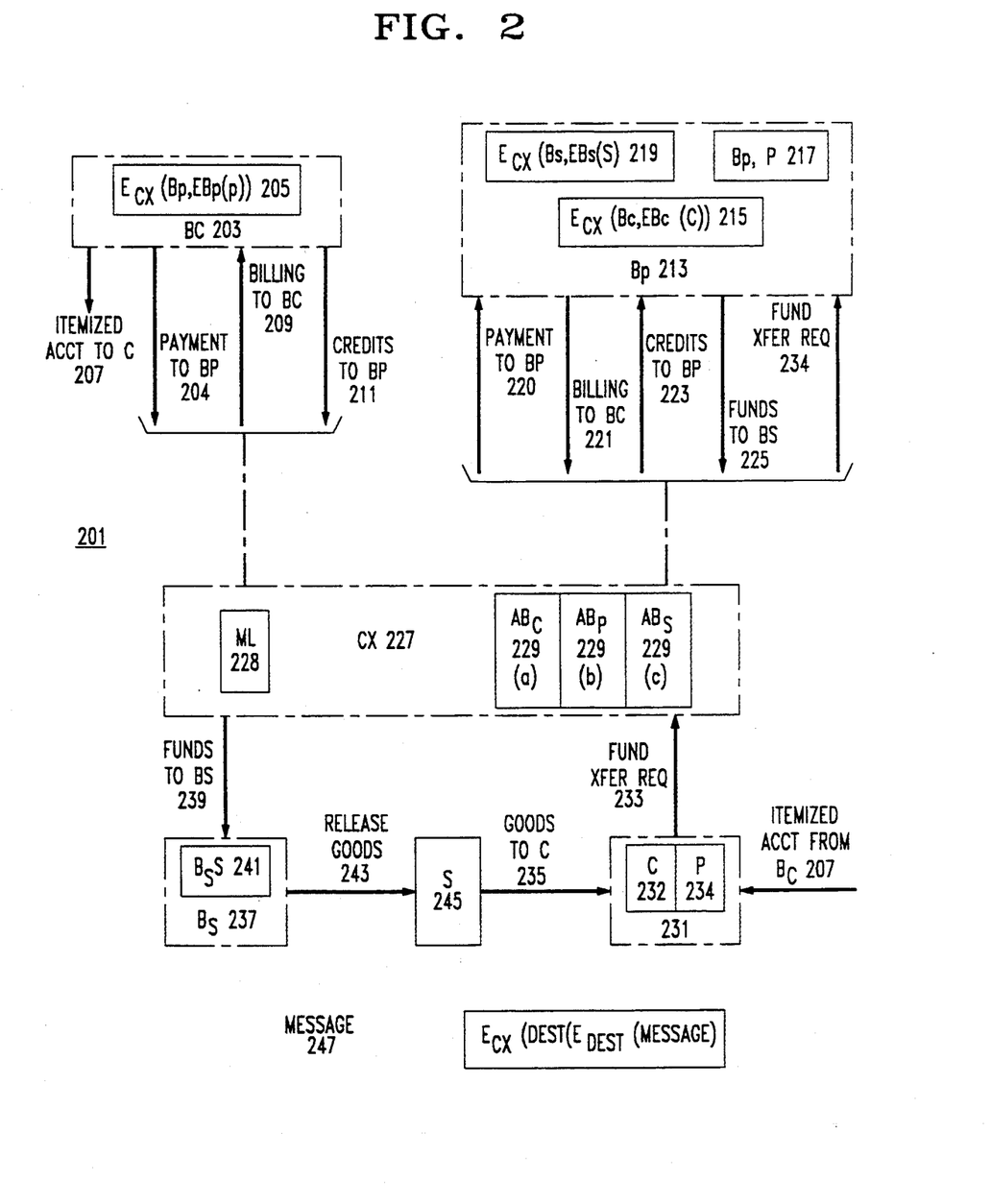
FIG. 2 is an overview of a preferred embodiment of the invention.

Overview of the Invention: FIG. 2

FIG. 2 shows the participants in an anonymous credit card transaction and the messages which flow between the participants in the course of the transaction. The participants are indicated by circles and messages are indicated by arrows which point from the source of the message to the destination of the message. Information which a participant must maintain during the transaction is indicated by boxes within the circle representing the participant. It should be pointed out at this point that a credit card transaction is to be considered herein as any kind of transaction where completion of the transaction is dependent on approval by a third party.

To protect privacy, a customer C 231 maintains accounts at two different banks $B_c$ 203 and $B_p$ 213. Bank $B_c$ 203 issues the anonymous credit card and knows the identity 232 of C 231. Bank $B_p$ 213 only manages money or credits that have been deposited in the account. Since it does not extend credit, bank $B_p$ 213 knows customer 231 only by the pseudonym P 234. In the following, we will use P and C interchangeably to refer to customer 231.

At the beginning of a billing period, bank $B_c$ 203 places credits in P's account ($B_p$,P) at $B_p$ 213 (arrows 211, 223). To use these credits to make purchases at a store S 245, P 234 requests bank $B_p$ to transfer funds from account ($B_p$,P) to the store's account ($B_s$,S) at possibly another bank $B_s$ 237 (arrows 233, 234). $B_s$ 237 then notifies store S 245, which releases the merchandise to P (arrow 243). At the end of a billing period, $B_p$ 213 presents bank $B_c$ 203 with a bill (arrows 221, 209), which $B_c$ 203 pays (arrows 204, 220). $B_c$ 203 presents the bill to C 231 (arrow 207). When C 231 pays the bill, $B_c$ 203 places additional credits in ($B_p$,P) 217 (arrows 211, 223).

The key idea is to use cryptographic techniques to enable 1) banks $B_c$ and $B_p$ to communicate without knowing each other or the account for which the transaction is destined; and 2) bank $B_p$ to transfer funds to $B_s$, without knowing each other. This is done with the aid of an intermediary for all communications, which we call the communication exchange cx 227. To achieve criterion 1, C 231 stores the encrypted address $E_{cx}(B_p, EB_{Bp}(P))$ 205 at bank $B_c$ 213. Here, $EB_{Bp}(P)$ is the account owner P encrypted with bank $B_p$'s public key 103, and $E_{cx}(B_p, \ldots)$ is the destination bank $B_p$ 213 (and account owner) encrypted with cz's public key 103. To place credits in ($B_p$,P) 217, $B_c$ 203 sends a message 247 together with the encrypted destination $E_{cx}(B_p, E_{Bp}(P))$ 205 to cx 227; cx determines, and forwards the message to, the destination bank $B_p$; only $B_p$ can determine the destination account. Note that P is hidden from cx, and both $B_p$ and P are hidden from $B_c$. A similar technique is used for sending a billing statement from $B_p$ to $B_c$ without one knowing the other. To achieve criterion 2, $B_p$ is given by the customer P at the store the encrypted address $E_{cz}(B_s, E_{Bs}(S))$ 219, and uses it to transfer funds to ($B_s$,S) in a similar way. In the preferred embodiment, the information required for messages 233 and 234 is obtained from two sources: C 231's credit card, which contains a specification of $B_p$ 213 which cx 227 can read and P 234, and a credit card purchase device at S 245, which contains a specification of $B_s$ 237 which cx 227 can read and a specification of ($B_{ds}$,S) which $B_s$ 237 can read. This information, plus the amount of the proposed purchase, makes up message 233, which is sent by the credit card purchase device to cx 227.

Besides transferring messages between the parties to the transaction, cx 227 acts as a central bank. cx 227 keeps an account 229(a ... n) for every bank. A fund transfer from a bank to another bank is recorded in their accounts 229 at cx 227. This is possible since cx 227 knows the source and destination banks for all fund transfers. Periodically, the accounts are settled up. When an imbalance occurs in the funds of a bank, cx 227 requests assets from the bank or sends assets to the bank. Since banks do not have to transfer assets directly among themselves, they need not know each other's identity. All transfers are signed and logged by cx 227 in message log 228 to provide an audit trail if a dispute arises. In another embodiment, there may be a central bank which is separate from cx 227; in such an embodiment, cx 227 would send the central bank the messages required for the funds transfers between the participating banks.

Since all fund transfers take place electronically between banks, the bits representing money are never in the possession of individuals, who may otherwise duplicate and spend these bits over and over again.

Figure 3:
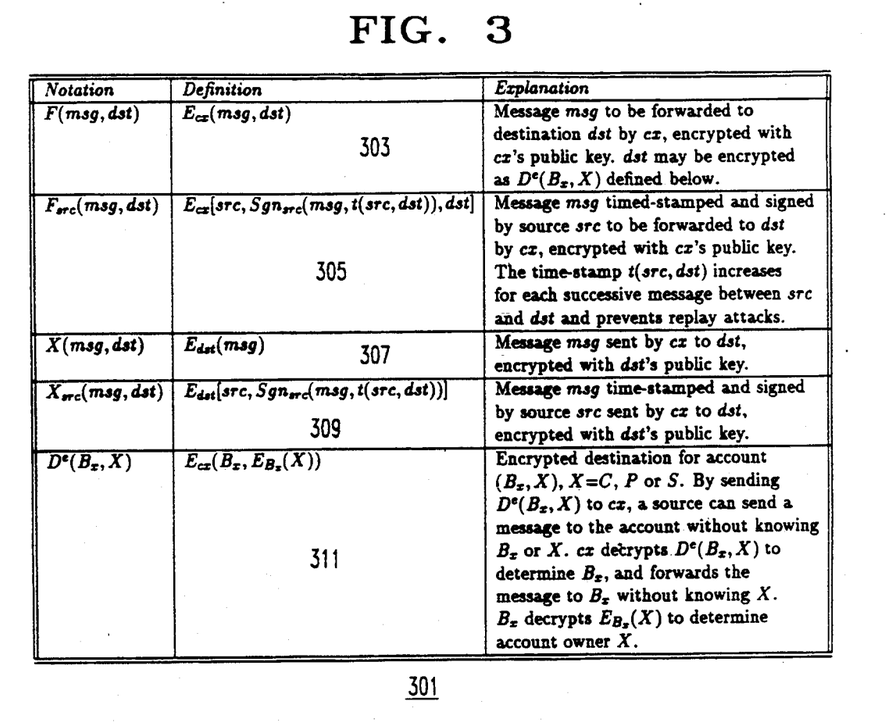
FIG. 3 is a table of the message formats used in the invention.

Notations: FIG. 3

The protocol is executed by the players C, $B_c$, P, $B_p$, S, $B_s$, and cz. It uses two well-known public-key cryptographic tools—public-key encryption $E_A(msg)$ and signature $Sgn_A(msg)$. The message msg is always appended with a random number before every encryption; e.g. $E_{cx}(B_p, E_{Bp}(P))$ contains two random numbers, one for $E_{cx}$ and the other for $E_{Bp}$. This prevents a player that has all the information in the message but not the message itself from computing the encrypted version $E_A(msg)$.

The communication from a source src to a destination dst is accomplished by a message pair $m_1(src, dst)$ and $m_2(src, dst)$. A source src, or a destination dst, is one of C, $B_c$, P, $B_p$, S, and $B_s$. Four types of message formats are summarized in FIG. 3:

$m_1(src, dst)$ is sent by src to cx and is formatted in $F(msg, dst)$ 303 or $F_{src}(msg, dst)$ 305;

$m_2(src, dst)$ is sent by cx to dst and is formatted in $X(msg, dst)$ 307 or $X_{src}(msg, dst)$ 309.

Also defined in the table is the encrypted address for anonymous communications. C stores $D^e(B_p,P)$ 311 at $B_c$ to allow $B_c$ to place credits into account ($B_p$,P) without knowing $B_p$ or P, and stores $D^e(B_c,C)$ at $B_p$ to allow $B_p$ to send bills for account ($B_c$,C) without knowing $B_c$ or C. During a purchase, P provides $B_p$ with $D^e(B_s,S)$ to allow $B_p$ to transfer funds into store's account without knowing $B_s$ or S.

Finally, $E_p(msg)$ in the protocol is a message m encrypted with P's public key. It is used by P to store information at $B_p$ that only P can decrypt. For additional security, $B_p$ may ask the customer questions and compared the answers received. For this, P stores a set of questions $Q_i$ and answers $A_i$ at $B_p$ as $\{E_p(Q_i), E_p(A_i)\}$. The questions are personal and known only to P. To authenticate P, $B_p$ picks at random an $E_p(Q_i)$ and sends it to P at the store. P's anonymous credit card &crypts the question and presents $Q_i$ to P. P answers it, the card encrypts it and sends $E_p(A_i)$ to $B_p$ for comparison with the stored encrypted answer. Depending on the amount of purchase, the bank may ask a different number of questions.

Protocol Specification

In a preferred embodiment, a protocol implementing the invention consists of three distinct subprotocols. The first subprotocol is used when $B_c$ 203 places credits into P's account at $B_p$ 213. The second part is used during a purchase in which the customer 231 requests $B_p$ 213 to transfer funds to $(B_s,S)$ 237. The third part is used when $B_p$ sends $B_c$ a billing statement for the customer's purchases. The first and third subprotocols are typically executed once every billing period, while the second subprotocol is executed during every purchase.

As noted earlier, all messages are logged by cx 227 to provide an audit trail when dispute arises.

Subprotocol 1: Extension of credit (arrows 211, 223)

1. $B_c$ 203 sends cx 227 the signed message 305:

$$m_i(B_c,B_p) = F_{B_c}(\delta_{CR}, D^e(B_p,P))$$

to place a credit $\delta_{CR}$ into $(B_p,P)$ 217.

2. $B_p$ 213 receives from cx 227 the message 309:

$$m_2(B_c,B_p) = X_{cx}[(\delta_{CR}, E_{B_p}(P)), B_p]$$

signed and guaranteed by cx 227.

3. $B_p$ 213 increments P's credit by $\delta_{CR}$.

The second subprotocol consists of two phases. In the first phase, $B_p$ 213 authenticates P 234 at the store after receiving a transaction request. In the second phase, $B_p$ 213 transfers funds to $(B_s,S)$ 241.

Figure 4:
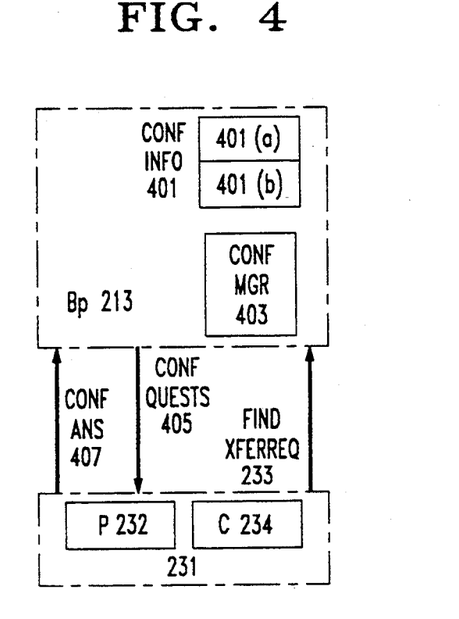
FIG. 4 is a diagram of a verification technique employed in a preferred embodiment.

Subprotocol 2: During purchase Phase 1: Authentication of P (233, 405, 407)

1. P 234 at store S 245 sends to cx 227 a message 303:

$$m_1(P,B_p) = F[X_P(R,B_p),B_p]$$

to request a transaction with $B_p$ 213. Here, $$R = [\delta, PIN, D^e(B_s,S), E_{cx}(S), E_p(record)]$$

$\delta$ is the amount of credit that P requests. PIN is the personal identification number used to identify P to bank $B_p$. $D^e(B_s,S)$ is (the encrypted) S's account at $B_s$ to be used by $B_p$ for fund transfer. It is computed by P's anonymous credit card from $(B_s,S)$.[1] $E_{cx}(S)$ is the encrypted address of the automatic cash register at S through which P and $B_p$ communicate. $E_p(record)$ is a personal record P associates with the purchase to trace questionable purchases. It can be decrypted only by P. It is sent to $B_c$ by $B_p$ with the bill at the end of a billing period (see below).

Note that even if $B_p = B_s$, $B_p$ cannot compare the received $D^e(B_s,S)$ with precomputed encrypted addresses of all its store customers in order to associate P with S. This is because a random number is appended before each encryption.

2. $B_p$ 213 receives the message 309 from cx 227

$$m_2(P,B_p) = X_P(R,B_p)$$

signed by P 231 requesting a fund transfer. Depending on the amount of the transaction, $B_p$ may accept a PIN or may make one or more challenges in a challenge-response phase described in steps 3–7 and shown in FIG. 4.

3. Confirmation manager 403 in $B_p$ 213 randomly selects a question from confidential information 401 and sends the question to P in a message 303 (arrow 405):

$$m_1(B_p,P) = F[X_{B_p}(E_p(Q_i),P), E_{cx}(S)]$$

4. P 231 receives the message 307

$$m_2(B_p,P) = X[X_{B_p}(E_p(Q_i),P),S]$$

Note that cx 227 appends $X_{B_p}(E_p(Q_i),P)$ with a random number and encrypts it before forwarding, in order to break a link for collusion between $B_p$ and on S 245 that eavesdrops. Otherwise, if cx 227 simply forwards $X_{B_p}(E_p(Q_i),P)$, then this message will serve for $B_p$ and S that eavesdrops as a link unique to the transaction and allows them to combine their information.

5. P sends the answer $A_i$ to $B_p$ in the message 303 (arrow 405):

$$m_1'(P,B_p) = F[X_P(E_p(A_i),B_p),B_p]$$

6. $B_p$ receives the message 309

$$m_2'(P,B_p) = X_P(E_p(A_i),B_p)$$

7. If P's answer is correct and if the account $(B_p,P)$ has enough credit, $B_p$ starts the fund-transfer phase.

Phase 2: Fund transfer

8. $B_p$ 213 sends cx 227 the signed message 305 (arrow 225)

$$m_1(B_p,B_s) = F_{B_p}[(1-\alpha)\delta, D^e(B_s,S)]$$

$\alpha\delta$ is the service charge to the store.

9. After verifying the banks $B_p$ 213 and $B_s$ 237 and the signature, cx 227 transfers the amount $(1-\alpha)\delta$ from $B_p$'s account to $B_s$'s account at cx. It then sends $B_s$ the message 309

$$m_2(B_p,B_s) = X_{cx}[((1-\alpha)\delta, E_{B_s}(S)), B_s]$$

signed and guaranteed by cx 227 (arrow 239).

10. On receiving $m_2(B_p,B_s)$, $B_s$ sends a signed confirmation of the transfer 303

$$m_1(B_s,S) = F[X_{B_s}(rcvd\ \delta,S),S]$$

to cx 227, which forwards it as $$m_2(B_s,S) = X_{B_s}(rcvd\ \delta,S)$$

to S 245 (not shown in FIG. 2). S then releases the merchandise to P 231 (arrow 243).

At the end of a billing period, suppose P 231 has charged an amount $\Delta$, and $B_p$ 213 has given the amount $(1-\alpha)\Delta$ to stores' banks. $B_p$ 213 has $B_c$'s 203 guarantee to pay the debt, and it is $B_c$'s responsibility to collect $\Delta$ from C 231. By negotiation, the banks have agreed that $B_p$ deserves a fraction $\beta$ of the excess funds $\Delta\alpha$ and $B_c$ deserves $1-\beta$ of it. The following subprotocol is used to bill $(B_c,C)$.

Subprotocol 3: Billing $(B_c,C)$

1. $B_p$ 213 sends cx 227 the signed message 303 (arrow 221)

$$m_1(B_p,B_c) = F_{B_p}[(Rqst, E_p(record)), D^e(B_c,C)]$$

Here, $Rqst=(1-(1-\beta))\alpha\Delta$ is the amount $B_p$ is requesting from $B_c$, and $\Delta$ is the amount $B_c$ should bill C. $E_p$(-record) is the encrypted itemized record of purchases generated by C's anonymous credit card. It can only be decrypted by C.

2. After verifying $B_p$ and $B_c$ and the signature, cx 227 transfers the amount Rqst from $B_c$'s account to $B_p$ 's account at cx. It then sends $B_c$ 203 the message 309 (arrow 209)

$$m_2(B_p,B_c)=X_{cx}[(Rqst,E_p(Record),\,E_{B_c}(C)),B_c]$$

signed by cx 227.

$B_c$ 203 sends C a bill for $\Delta$ amount together with purchase record $E_p$(record) (arrow 207). If C challenges the bill, there is a complete audit trail of messages 228 logged by cx 227. When C pays PAY amount, $B_c$ extends PAY additional credit to $(B_p,P)$ using subprotocol 1.

Other features of conventional credit cards can also be implemented. For instance, if the credit card is reported lost by C, $B_c$ can use subprotocol 1 to reduce the credit in $(B_p,P)$ to zero. The customer has the option of setting triggers on account $(B_p,P)$, so that $B_p$ can use subprotocol 3 to notify the customer, through $B_c$, when abnormal spending patterns are detected.

Collusion

One way in which the privacy of C 231 with regard to a transaction can be compromised is by collusion between other parties to the transaction or between the communications exchange and one or more of the other parties. By colluding, the parties can obtain information that is unavailable to them individually. For purposes of the present discussion, C's privacy has been compromised with regard to a transaction if a party other than C knows C's identity and the merchandise M or the store S or both.

The anonymous credit card protocols which have just been described are secure against collusion as follows:

if cx 227 is trusted, no collusion among the banks and stores can comprise the customer.

even if cx 227 is not trusted, if S 245 does not eavesdrop when C 231 communicates with $B_p$ 213, then all parties and cx 227 have to collude to associate C 231 with M.

if S 245 does eavesdrop, then all players except $B_s$ 227 have to collude to associate C with M.

No collusion is possible if cx 227 is trusted because the random number included in every encryption ensures that the source and destination of a message transfer cannot collude on the message content without first colluding with cx 227.

Figure 5:
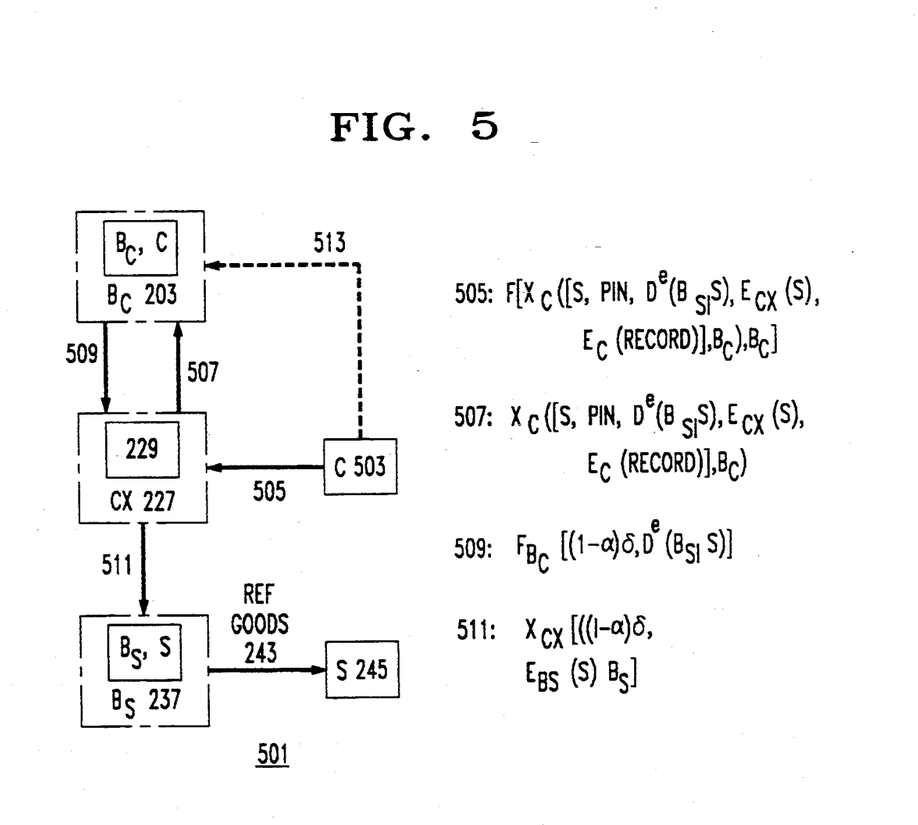

Simplified implementation: FIG. 5

There is a simplified implementation of the anonymous credit card transfer protocol which also has the kind of security against collusion which was just described. The simplified implementation is shown in FIG. 5.

In simplified implementation 501, customer C 503 need maintain an account only at the card-issuing bank $B_c$ 203. There is no longer any need for bank $B_p$ 213, pseudonym P 234, or subprotocols 1 and 3. Instead, all that is needed is a protocol which transfers funds from $B_c$ 203 to $B_s$ 237 during each purchase. The messages in the simplified protocol appear as messages 505, 507, 509, and 511 in FIG. 5. As may be seen from FIG. 5, the messages are those of subprotocol 2, except that all references to P and $B_p$ are replaced by C and $B_c$, respectively.

Simplified implementation 501 presumes as did the original protocol that all communications are made via cx; it is however also possible for C 503 to communicate directly with $B_c$ 203, as shown by arrow 513. The message would be the same as message 505, except that the destination $B_c$ need not be specified to cx 227. We want to emphasize that, even though the simplified implementation is as secure as the original protocol with regard to collusion, the original protocol may offer additional protection not considered in our model. For instance, if each party independently decides whether or not to collude, the customer using the original protocol may have a smaller chance of being compromised.

As simplified implementation 501 shows, what is required if C is both to remain anonymous with respect to the transaction and to receive credit from $B_c$ is the following:

that $B_c$ receive no readable information concerning the transaction beyond what it needs to extend credit;

that $B_s$ receives no information which it can read which associates M or S with C; and that Cx receive no information which it can read other than destination for messages and fund transfers between banks.

In the preferred embodiment, the above goal is attained by encrypting message 507 such that $B_c$ 203 can read the account number and the amount to be debited, but not the information relating to $B_s$ 237 and such that cx 227 can read only destinations. The system is further strengthened by having cx 227 remove those parts of the message not needed at the destination. In other embodiments, cx 227 might disassemble message 505 and send only the part relevant to $B_c$ 203 to $B_c$ 203 and after receiving an indication of approval from $B_c$ 203, sending the part relevant to $B_s$ 237 to $B_c$ 237. In such an implementation, cx 227 would include an identifying tag with the message to $B_c$ 203. The tag would associate the message to $B_c$ 203 with the message to $B_s$ 237 and would be included by $B_c$ 203 in the approval message to cx 227.

Conclusion

The foregoing Detailed Description has disclosed to those of ordinary skill in the art how an anonymous credit card protocol may be employed to permit a credit card holder to make non-cash purchases of goods or services without disclosing to the bank which issued the credit card what goods or services were purchased. The principles disclosed with regard to the anonymous credit card protocol may be employed generally in situations where a transaction between two parties requires that a third party vouch for the ability of one of the parties to make the transaction. Key elements of the principles are the use of a communications exchange to pass information between the parties of the transaction and the use of encrypted messages in which a party to the transaction or the communications exchange can read only that information which is required for the party's or the information exchange's part in the transaction.

Not only may the principles disclosed herein be employed in areas other than credit card transactions, but as has been shown by the two embodiments of anonymous credit card protocols disclosed herein, the principles may be employed in many different forms of anonymous credit card protocols. Further, as will be apparent to those of ordinary skill in the arts concerned, there are many different ways of actually implementing any such protocol. For example, the preferred embodiments employ public key cryptography; however, any other technique which ensures that parties to a transaction receive only the information which they require for the transaction will serve as well.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted with the full breadth permitted by the patent laws.

What is claimed is:

1. A method of making a non-cash transaction involving a first party, a second party, and a third party which approves the transaction for the second party, the method comprising the steps of:
   receiving a first message in the third party which describes the transaction, the first message containing first information about the transaction which is interpretable by the third party and which identifies the first party and a transaction amount but does not identify the second party or the subject matter of the transaction and second information about the transaction, the second information not being interpretable by the third party, containing no identification of the first party or the third party, and including third information identifying the second party;
   in the third party, responding to the first message by determining whether the transaction is to be approved;
   in the third party, sending a second message to a communications exchange, the second message indicating whether the transaction has been approved and including the second information and the communications exchange being able to read only the third information;
   in the communications exchange, responding to the third information by sending a third message indicating whether the transaction has been approved to the second party; and
   in the second party, responding to the third message by dealing with the transaction with the first party as indicated by the third message.

2. The method set forth in claim 1 wherein:
   the second information further includes fourth information about the transaction which is interpretable by the second party but not by the communications exchange; and
   the step of responding to the third message includes the step of responding to the fourth information.

3. The method set forth in claim 1 further comprising the steps of:
   receiving a fourth message which includes the first message and fifth information identifying the third party which is interpretable by the communications exchange; and
   in the communications exchange, responding to the fifth information by sending the first message to the third party.

4. The method set forth in any of claims 1, 2, or 3 further comprising the steps of:

encrypting the first information so that the first information is interpretable only by the third party;
   encrypting the third information so that the third information is interpretable only by the communications exchange; and
   encrypting the second information other than the third information so that that information is interpretable only by the second party.

5. The method set forth in claim 1 wherein:
   the first party is identified to the third party by a pseudonym; and the method further includes the steps of:
   in a fourth party which knows the first party by an identifier other than the pseudonym, receiving a fifth message which includes sixth information identifying the pseudonym and the third party, the information identifying the pseudonym being interpretable by the third party but not the fourth party or the communications exchange and the information identifying the third party being interpretable by the communications exchange but not the fourth party;
   in the fourth party, sending a sixth message to the communications exchange which includes the sixth information and a credit amount which the third party is to credit to the first party;
   in the communications exchange, responding to the information identifying the third party by sending a seventh message to the third party which includes the information identifying the pseudonym and the amount;
   and wherein
   the step of responding to the first message includes the step of determining from the credit amount and the transaction amount whether the transaction is to be approved.

6. The method set forth in claim 5 further including the steps of:
   in the third party, receiving an eighth message which includes seventh information identifying the first party and the fourth party, the information identifying the first party being interpretable by the fourth party but not the third party or the communications exchange and the information identifying the fourth party being interpretable by the communications exchange but not the third party;
   in the third party, sending a ninth message to the communications exchange which includes the seventh information and the transaction amount for at least one transaction;
   in the communications exchange, responding to the information identifying the fourth party by sending a tenth message to the fourth party which includes the information identifying the first party and the transaction amount; and
   in the fourth party, responding to the tenth message by debiting the first party for the transaction amount.

7. The method set forth in claim 1 wherein:
   the communications exchange further transfers funds between the second party and the third party;
   the third information further includes the transaction amount; and
   the method includes the step performed in the communications exchange of:
   additionally responding to the third information by transferring an amount based on the transaction amount from the second party to the third party.

8. The method set forth in claim 7 wherein:
the step of sending a third message includes the step of including the amount based on the transaction amount in the third message, the amount based on the transaction amount being interpretable by the second party.

9. The method set forth in claim 1 further comprising the step of:
receiving personal information in the third party from the first party;
and wherein
the second information includes eighth information by means of which the communications exchange can send a message to the first party and
the step of determining whether the transaction is to be approved includes the steps of
sending an eleventh message to the communications exchange which includes the eighth information and a question based on the personal information, the question being interpretable only by the first party,
in the communications exchange, sending a twelfth message to the first party which contains the question,
in the communications exchange, receiving a thirteenth message from the first party which contains an answer to the question which is interpretable only by the third party;
in the communications exchange, responding to the fifth information by sending a fourteenth message to the first party which contains the answer; and
in the first party, comparing the answer with the personal information and using the result of the comparison in determining whether the transaction is to be approved.

10. The method set forth in claim 9 and further including the step performed in the third party of:
determining whether the eleventh message is to be sent on the basis of the transaction amount.

11. The method set forth in claim 10 wherein:
the step of determining whether the eleventh message is to be sent includes the step of determining whether more than one eleventh message is to be sent.

12. A method wherein a first party and a second party make a non-cash transaction which is approved for the second party by a third party, the method comprising the steps of:
receiving a first message in the third party which describes the transaction, the first message containing first information about the transaction which is interpretable by the third party and which identifies the first party and a transaction amount but does not identify the second party or the subject matter of the transaction and second information about the transaction, the second information not being interpretable by the third party, containing no identification of the first party or the third party, and including third information identifying the second party;
in the third party, responding to the first message by determining whether the transaction is to be approved;
in the third party, sending a second message to a communications exchange, the second message indicating whether the transaction has been approved and including the second information and the communications exchange being able to read only the third information and the communications exchange being operative to respond to the third information by sending a third message indicating whether the transaction has been approved to the second party, whereby the second party may deal with the transaction with the first party as indicated by the third message.

13. The method set forth in claim 12 further comprising the steps of:
receiving a fourth message which includes the first message and fifth information identifying the third party which is interpretable by the communications exchange; and
the communications exchange is further operative to respond to the fifth information by sending the first message to the third party.

14. The method set forth in any of claims 12 or 13 further comprising the steps of:
encrypting the first information so that the first information is interpretable only by the third party;
encrypting the third information so that the third information is interpretable only by the communications exchange; and
encrypting the second information other than the third information so that that information is interpretable only by the second party.

15. A method of making a transaction between a first party and a second party in which a third party vouches for the first party to the second party, the method comprising the steps of:
receiving a first message in the third party which contains first information and second information, the first information being interpretable by the third party and containing information needed by the third party to vouch for the first party but no identification of the second party and the second information not being interpretable by the third party, containing no identification of the first party or the third party, and including third information identifying the second party;
in the third party, responding to the first message by determining whether to vouch for the first party;
in the third party, sending a second message to a communications exchange, the second message indicating whether the third party is vouching for the first party and including the second information, the communications exchange being able to read only the third information;
in the communications exchange, responding to the third information by sending a third message indicating whether the third party is vouching for the first party; and
in the second party, responding to the third message by dealing with the transaction with the first party as indicated by the third message.

16. A method wherein a third party vouches for a transaction between a first party and a second party, the method comprising the steps of:
receiving a first message in the third party which contains first information and second information, the first information being interpretable by the third party and containing information needed by the third party to vouch for the first party but no identification of the second party and the second information not being interpretable by the third party, containing no identification of the first party or the third party, and including third information identifying the second party;

in the third party, responding to the first message by determining whether to vouch for the first party;

in the third party, sending a second message to a communications exchange, the second message indicating whether the third party is vouching for the first party and including the second information, the communications exchange being able to read only the third information and the communications exchange being operative to respond to the third information by sending a third message indicating whether the third party is vouching for the first party to the second party, whereby the second party may deal with the transaction with the first party as indicated by the third message.

17. A method of automatically authenticating a first party to a second party comprising the steps of:

in the second party, responding to a request which apparently comes from the first party by sending an encrypted question which is readable only by the first party to the first party, the encrypted question having been previously provided by the first party together with a similarly-encrypted answer thereto;

in the first party, responding to the encrypted question by decrypting the question, making an answer to the question, encrypting the answer so that the answer is interpretable only by the first party, and sending the encrypted answer to the second party; and in the second party, responding to the encrypted answer by comparing the encrypted answer with the previously-provided encrypted answer, and if the comparison so indicates, treating the request as coming from the first party.

18. The method set forth in claim 17 further comprising the step of:

in the second party, asking questions of the first party to obtain the personal information.

19. The method set forth in claim 17 wherein:

in the second party, the step of responding to the request further includes the steps of:

determining a number of questions to send from the request's content; and repeating the step of sending an encrypted question and the remaining steps as required for the number of questions.

* * * * *